(12) United States Patent
Stanhope

(10) Patent No.: US 10,455,755 B2
(45) Date of Patent: Oct. 29, 2019

(54) SYSTEM AND METHOD FOR STRIP TILL IMPLEMENT GUIDANCE MONITORING AND ADJUSTMENT

(71) Applicant: CNH Industrial America LLC, New Holland, PA (US)

(72) Inventor: Trevor Philip Stanhope, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 127 days.

(21) Appl. No.: 15/692,279

(22) Filed: Aug. 31, 2017

(65) Prior Publication Data

US 2019/0059199 A1  Feb. 28, 2019

(51) Int. Cl.
*A01B 69/00* (2006.01)
*A01B 69/04* (2006.01)
*G05D 1/02* (2006.01)

(52) U.S. Cl.
CPC .......... *A01B 69/001* (2013.01); *A01B 69/008* (2013.01); *G05D 1/0248* (2013.01); *G05D 2201/0201* (2013.01)

(58) Field of Classification Search
CPC ... A01B 69/001; A01B 69/008; A01B 69/004; G05D 1/0248; G05D 2201/0201
See application file for complete search history.

(56) References Cited

U.S. PATENT DOCUMENTS

| | | | |
|---|---|---|---|
| 5,323,721 A | 6/1994 | Tofte et al. | |
| 5,675,489 A | 10/1997 | Pomerleau | |
| 5,974,348 A | 10/1999 | Rocks | |
| 6,285,930 B1 | 9/2001 | Dickson et al. | |
| 6,445,983 B1 | 9/2002 | Dickson et al. | |
| 6,768,944 B2 | 7/2004 | Breed et al. | |
| 6,819,780 B2 | 11/2004 | Benson et al. | |
| 7,218,775 B2 | 5/2007 | Kokko et al. | |
| 7,242,791 B2 | 7/2007 | Han et al. | |

(Continued)

FOREIGN PATENT DOCUMENTS

WO  20160182906 A1  11/2016

OTHER PUBLICATIONS

O'Connor et al; "Kinematic GPS for Closed-Loop Control of Farm and Construction Vehicles;" ION GPS-95, Sep. 1995.

*Primary Examiner* — Mussa A Shaawat
(74) *Attorney, Agent, or Firm* — Rebecca L. Henkel; Rickard K. DeMille

(57) ABSTRACT

An agricultural system includes a frame, one or more row units coupled to the frame, one or more imaging devices coupled to the frame, and a controller. The one or more imaging devices are configured to capture images of a field beneath the agricultural system as the agricultural system traverses the field. The controller includes a processor and a memory, and processes the images captured by the one or more imaging devices. Processing the captured images includes determining a location of an implement line aligned with a first row unit of the one or more row units, determining a location of a center line of a first strip of a plurality of strips of the field, wherein the plurality of strips are separated by a plurality of rows of untilled land, determining a location of a tracking line, and determining whether the implement line and the tracking line are aligned with one another.

20 Claims, 6 Drawing Sheets

(56) References Cited

U.S. PATENT DOCUMENTS

| | | | |
|---|---|---|---|
| 7,630,806 B2 | 12/2009 | Breed | |
| 7,703,404 B2 | 4/2010 | Horn et al. | |
| 8,028,506 B1* | 10/2011 | Casper | A01D 46/081 |
| | | | 172/5 |
| 8,189,901 B2 | 5/2012 | Modiano et al. | |
| 8,548,649 B2 | 10/2013 | Guyette et al. | |
| 8,577,537 B2 | 11/2013 | Matthews | |
| 8,633,810 B2 | 1/2014 | Luo et al. | |
| 8,625,310 B2 | 9/2014 | Kowalchuk | |
| 8,977,489 B2 | 3/2015 | Szczerba et al. | |
| 9,265,192 B2 | 2/2016 | Chan et al. | |
| 9,406,212 B2* | 8/2016 | De Luca | G06K 9/00281 |
| 9,408,342 B2 | 8/2016 | Lindores | |
| 10,137,951 B2* | 11/2018 | Gray | B62D 63/062 |
| 10,255,670 B1* | 4/2019 | Wu | G06T 7/0004 |
| 2006/0237200 A1* | 10/2006 | Unruh | A01B 69/004 |
| | | | 172/2 |
| 2008/0060825 A1* | 3/2008 | Unruh | A01B 69/004 |
| | | | 172/2 |
| 2008/0147282 A1* | 6/2008 | Kormann | A01B 69/003 |
| | | | 701/50 |
| 2008/0190628 A1* | 8/2008 | Steinlage | A01B 21/086 |
| | | | 172/166 |
| 2006/0304710 | 12/2008 | Xu et al. | |
| 2010/0249957 A1* | 9/2010 | Price | E02F 9/205 |
| | | | 700/83 |
| 2011/0169949 A1* | 7/2011 | McCain | E02F 3/847 |
| | | | 348/137 |
| 2012/0253613 A1* | 10/2012 | Davis | B44C 1/222 |
| | | | 701/50 |
| 2013/0008360 A1* | 1/2013 | Follmer | A01B 69/004 |
| | | | 111/54 |
| 2014/0379228 A1 | 12/2014 | Batcheller et al. | |
| 2015/0240453 A1* | 8/2015 | Jaliwala | E02F 9/2041 |
| | | | 701/50 |
| 2015/0373904 A1 | 12/2015 | Hahn et al. | |
| 2016/0010998 A1 | 1/2016 | Chia et al. | |
| 2017/0000020 A1 | 1/2017 | Maniar et al. | |
| 2017/0049044 A1 | 2/2017 | Stoller et al. | |
| 2017/0161972 A1* | 6/2017 | Moloney | G07C 5/0841 |
| 2017/0339822 A1* | 11/2017 | Gresch | B62D 6/002 |
| 2018/0153087 A1* | 6/2018 | Kovach | A01B 61/042 |
| 2018/0245316 A1* | 8/2018 | Forcash | E02F 1/00 |
| 2019/0150357 A1* | 5/2019 | Wu | A01C 21/007 |

\* cited by examiner

SYSTEM AND METHOD FOR STRIP TILL IMPLEMENT GUIDANCE MONITORING AND ADJUSTMENT

BACKGROUND

This disclosure relates generally to agricultural applications utilizing strip tilling, and more specifically to implement alignment for agricultural applications utilizing strip tilling.

Strip tilling involves tilling rows or "strips" of a field rather than tilling the whole field. Seeds of the desired agricultural product are then planted in the tilled strips and cultivated. Strip tilling combines the soil drying and soil warming benefits of conventional tilling (i.e., tilling the entire field) with the soil-protecting advantages of no-till agriculture, while enabling a reduction of resources used relative to conventional tillage. Typically, the same strips are used season after season. As such, an implement that is not properly aligned with the existing strips of the field may cause reduced productivity and/or efficiency of an agricultural operation. For example, if a row of seeds is planted offset with respect to the desired planting line within a tilled strip, the yield of the crop may decrease and the difficulty of conducting subsequent field operations may worsen.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, an agricultural implement includes a frame, one or more row units coupled to the frame (e.g. planter row unit or sprayer nozzles), one or more imaging devices coupled to the frame, and a controller. The one or more imaging devices are configured to capture images of a field beneath the agricultural implement as the agricultural implement traverses the field. The controller includes a processor and a memory, and processes the images captured by the one or more imaging devices. Processing the captured images includes determining a location of an implement line aligned with a first row unit of the one or more row units, determining a location of a center line of one or more strips of a plurality of strips of the field, determining a location of a tracking line with respect to the center line of the strips, wherein the plurality of strips are separated by a plurality of rows of untilled land, and determining whether the implement line and the desired tracking line are aligned with one another.

In another embodiment, an imaging system includes one or more imaging devices and a controller. The imaging devices are coupled to a frame of an agricultural vehicle, and capture images of a field beneath the agricultural vehicle as the agricultural vehicle traverses the field. The controller includes a processor and a memory, and processes the images captured by the one or more imaging devices. Processing the captured images includes determining a location of an implement line aligned with a first row unit of the agricultural system, determining a location of a center line of a first strip of a plurality of strips of the field, determining a location of a tracking line with respect to the center line of the strips, wherein the plurality of strips are separated by a plurality of rows of untilled land, and determining whether the implement line and the desired tracking line are aligned with one another.

In a further embodiment, a method includes directing an agricultural system across a field, wherein the agricultural system includes a work vehicle and an implement, and wherein the implement comprises one or more row units, capturing one or more images of the field beneath the agricultural system as the agricultural system traverses the field, via one or more imaging devices coupled to the agricultural system, and processing the captured images. Processing the captured images includes determining a location of an implement line aligned with a first row unit of the one or more row units, determining a location of a center line of a first strip of a plurality of strips of the field, determining a location of a tracking line with respect to the center line of the strips, wherein the plurality of strips are separated by a plurality of rows of untilled land, and determining whether the implement line and the desired tracking line are aligned with one another.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
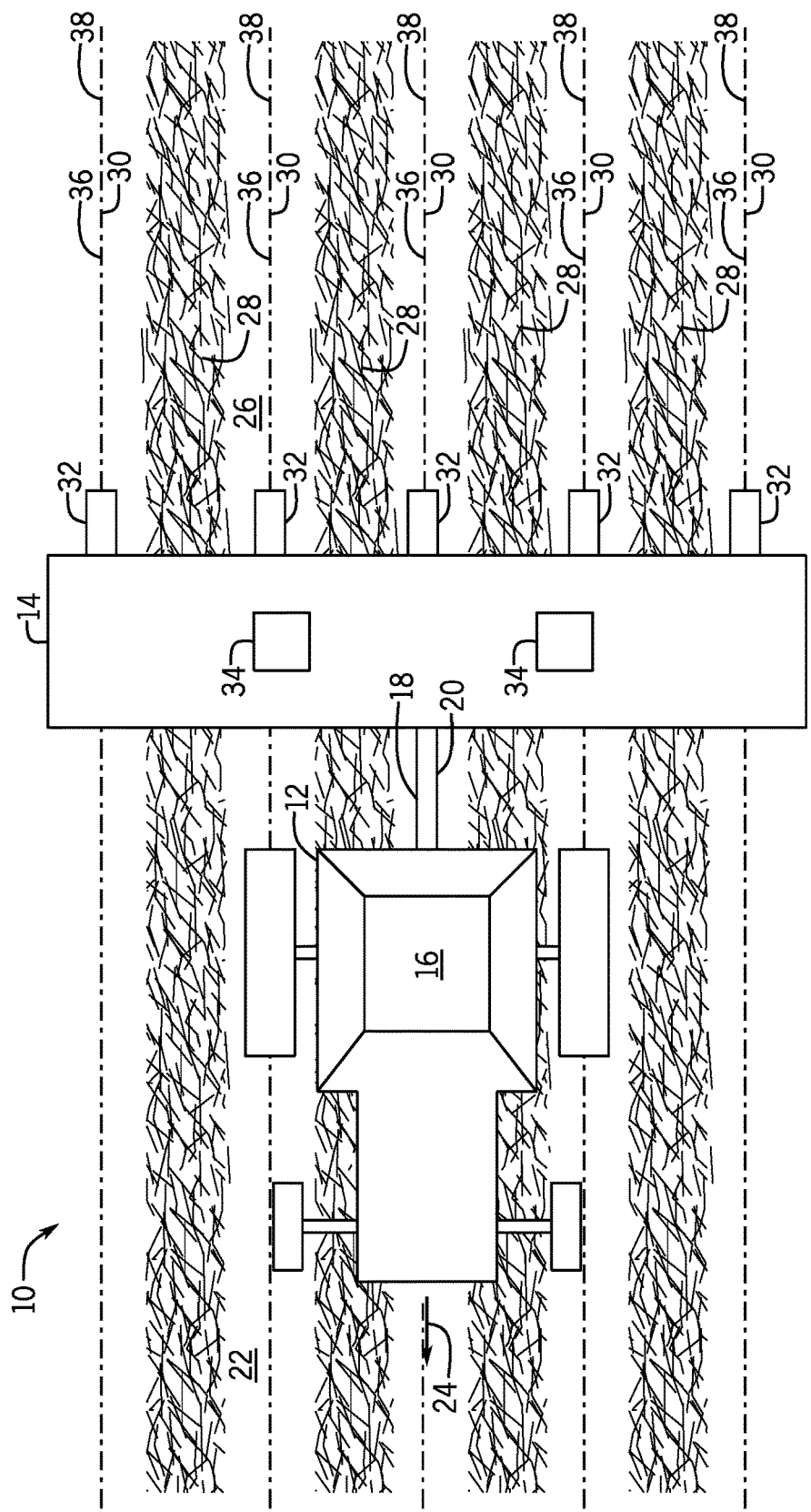
FIG. 1 is a top view of an embodiment of an agricultural system.

FIG. 1 is a top view of an embodiment of an agricultural system 10. The agricultural system 10 includes a work vehicle 12 (e.g., a tractor, a self-propelled sprayer, a self-propelled spreader, etc.) and an agricultural implement 14 (e.g., a tillage tool, a planter, etc.). In some embodiments, the agricultural implement 14 may be towed behind the work vehicle 12 (e.g., as shown in FIG. 1). In other embodiments, the agricultural implement 14 may be incorporated into the work vehicle 12. The work vehicle 12 may be any vehicle suitable for towing the agricultural implement 14, such as a tractor, off-road vehicle, or the like. The work vehicle 12 may include a cab 16, in which an operator sits during operation of the work vehicle 12. Additionally, the agricultural implement 14 may be any suitable implement, such as a ground-engaging implement (e.g., a soil conditioner, a tillage implement, a fertilizer application implement, a planter, a seeder, etc.) or non-ground engaging (e.g., a sprayer, spreader, or applicator), suitable for agricultural use. The agricultural implement 14 may be coupled to the work vehicle 12 via a hitch 18. In one embodiment, the hitch 18 may be a three-point hitch that rigidly couples the implement 14 to the work vehicle 12, such that the implement 14 can move upward and downward, but cannot freely rotate with respect to the work vehicle 12. In another embodiment, the implement 14 may be coupled to the work vehicle 12 via a drawbar, enabling the implement to move upward, downward, and rotate with respect to the work vehicle 12. It should be understood, however that other systems for coupling the implement 14 to the work vehicle 12 may be utilized. In some embodiments, the implement 14 may be coupled to the front of the work vehicle 12. In the illustrated embodiment, the agricultural implement 14 is attached to the work vehicle 12 via a frame 20 and the hitch 18. The agricultural system 10 travels over a field 22. The work vehicle 12 is configured to tow the agricultural implement 14 in a direction of travel 24. For reference, a forward direction should be understood to be in the direction of travel 24 and a rearward direction should be understood to be opposite the direction of travel 24.

As shown, strips 26 are separated by untilled rows 28 of land. Generally, the same strips 26 and untilled rows 28 are used season after season. In some embodiment, the operator may have a map (e.g., GPS, GLONASS, Galileo, BeiDou, etc.) of the strips, which may be utilized to guide the work vehicle 12 and the implement 14 across the field 22. In the illustrated embodiment, a center line 30 extends through the center of each strip 26. For tilling, the implement 14 (e.g., a tilling implement) traverses the field 22 with row units 32 aligned with tilling tracking lines 36. As the implement 14 traverses the field 22, the row units 32 till the soil of the strips 26. For planting, the implement 14 (e.g., a planting implement) traverses the field 22 with row units 32 aligned with planting tracking lines 38. As the implement 14 traverses the field 22, the row units 32 plant seeds in the field along the planting tracking lines 38. In the illustrated embodiment, the tilling tracking lines 36 and the planting tracking lines 38 extend through the center of each strip 26, along the center line 30 of each strip. However, in some embodiments (e.g., offset planting), the tilling tracking lines 36 and/or the planting tracking lines 38 may be offset from the center lines 30.

If the implement 14 is not directed across the field 22 during tilling or planting such that the row units 32 align with the tilling tracking lines 36 and/or the planting tracking lines 38, efficiency and/or production of the agricultural operation may be reduced. Accordingly, one or more imaging devices 34 (e.g., cameras) may be disposed on the work vehicle 12 and/or the implement 14 and configured to generate images of the field 22, and in some cases, a portion of the implement 14, such that a determination may be made as to whether the row units 32 are aligned with the strips 26. The one or more imaging devices 34 may be digital still cameras, digital video cameras, analog cameras, RGB cameras, RGB-D cameras, infrared (IR) cameras, multispectral cameras, other imaging devices, or some combination thereof. The one or more imaging devices 34 may be monocular or stereovision. In some embodiments, the one or more imaging devices 34 may also include laser scanners, proximity sensors, radar sensors, or other devices that may not generate a two-dimensional image. For example, if the one or more imaging devices 34 are laser scanners, proximity sensors, the imaging devices 34 may generate a one-dimensional indication of a distance, a two-dimensional scan-line, or a three-dimensional point-cloud of the field 22 and/or the implement 14 (e.g., row unit 32). If the one or more imaging devices return data that indicates the operation is outside of an expected range, it may be assumed that the row units 32 are not aligned with the strips 26. The one or more imaging devices 34 may be coupled to the work vehicle (e.g., via a frame of the work vehicle) and/or the implement (e.g., via an implement tool bar, one or more row units, etc.), and may be directed forward (e.g., toward the work vehicle, along the direction of travel) or rearward (e.g., away from the work vehicle, opposite the direction of travel).

Figure 2:
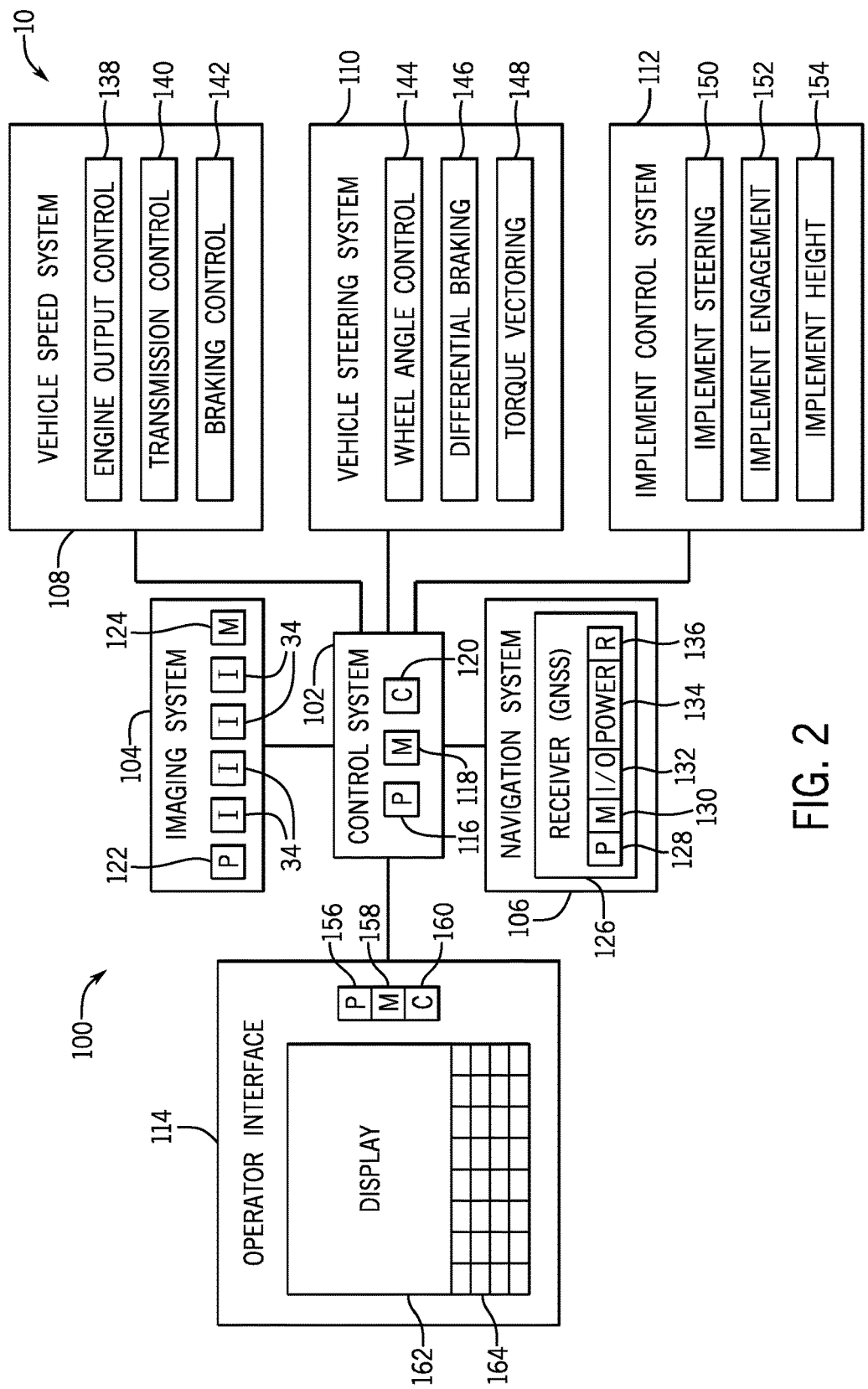
FIG. 2 is a schematic view of an embodiment of a control system of the agricultural system of FIG. 1.

FIG. 2 is a schematic view of one embodiment of a control system 100 that may be set within the agricultural system 10 of FIG. 1. In the illustrated embodiment, the control system 100 includes a work vehicle control system 102, an imaging system 104, a navigation system 106, a work vehicle speed system 108, a work vehicle steering system 110, an implement control system 112, and an operator interface 114. However, it should be understood that other embodiments of the control system 100 may include different elements in alternative combinations.

The work vehicle control system 102 includes a processor 116, a memory component 118, and communication circuitry 120. The processor 116 may include one or more general-purpose processors, one or more application specific integrated circuits, one or more field programmable gate arrays, or the like. The memory 118 may be any tangible, non-transitory, computer readable medium that is capable of storing instructions executable by the processor 116 and/or data that may be processed by the processor 116. In other words, the memory 118 may include volatile memory, such as random access memory, or non-volatile memory, such as hard disk drives, read-only memory, optical disks, flash memory, and the like. The communication circuitry 120 may be configured to receive inputs (e.g., feedback signals, sensor signals, etc.) and transmit outputs (e.g., control signals, command signals, etc.) to/from the imaging system 104, the navigation system 106, the work vehicle speed system 108, the work vehicle steering system 110, the implement control system 112, and the operator interface 114.

As shown, the imaging system 104 may include a processor 122, a memory component 124, and one or more imaging devices 34. The processor 122 may include one or more general-purpose processors, one or more application specific integrated circuits, one or more field programmable gate arrays, or the like. The processor 122 may control the imaging devices 34 (e.g., control when imaging data is captured). In some embodiments, the processor 122 may also be used to process and/or analyze data provided by the imaging devices 34. The memory 124 may be any tangible, non-transitory, computer readable medium that is capable of storing data provided by the imaging devices 34 (e.g., image files), and/or storing instructions executable by the processor 122 and/or data that may be processed by the processor 122. The memory 124 may include volatile memory, such as random access memory, or non-volatile memory, such as hard disk drives, read-only memory, optical disks, flash memory, and the like.

The navigation system 106 may be in communication with the work vehicle control system 102 (e.g., via the communication circuitry 120). The navigation system 106 may include a Global Navigation Satellite System (GNSS) receiver 126 configured to communicate with two or more satellites in orbit (e.g., GPS, GLONASS, Galileo, BeiDou, etc.) to determine the location, heading, speed, etc. of the work vehicle. The receiver 126 may include one or more processors 128, a memory component 130, input/output devices 132, a power supply 134, and radio circuitry 136. The processors 128 may execute software stored on the memory component 130 to determine the position of the work vehicle. In some embodiments, the work vehicle position, heading, speed, etc. may be compared relative to a map or a planned path stored in the memory 130. Based on the determined position, the processor 128 may also determine work vehicle heading, speed, etc. Based on the information received from the navigation system 106, the work vehicle control system 102 may determine (e.g., via the processor 116) the relative proximity of the work vehicle and/or the implement to one or more strips, one or more boundaries, one or more headlands, etc.

The work vehicle speed system 108 may control the speed of the work vehicle along the direction of travel. Control of the speed may be by control of a throttle, a clutch, brakes, a transmission, one or more other systems, or a combination thereof. In the illustrated embodiment, the speed control system 108 includes an engine output control system 138, a transmission control system 140, and a braking control system 142. The engine output control system 138 is configured to vary the output of an engine to control the speed of the work vehicle. For example, the engine output control system 138 may vary a throttle setting of the engine, a fuel/air mixture of the engine, a timing of the engine, and/or other suitable engine parameters to control engine output. In addition, the transmission control system 140 may adjust a gear ratio within a transmission to control the speed of the work vehicle. For example, the transmission control system 140 may enable manual or automatic changing of gears or a gear ratio via the transmission as a way to control the speed of the work vehicle. The transmission may include a number of fixed gear ratios or a continuously variable gear ratio. Furthermore, the braking control system 142 may adjust braking force, thereby controlling the speed of the work vehicle (e.g., slow the work vehicle down at the end of a row in order to make a turn). While the illustrated work vehicle speed system 108 includes the engine output control system 138, the transmission control system 140, and the braking control system 142, alternative embodiments may include any of these systems, in any suitable combination. Further embodiments may include a work vehicle speed system 108 having other and/or additional systems to facilitate adjusting the speed of the work vehicle. The work vehicle speed system may be controlled by the operator in a manual mode of operation. In an automatic or semi-automatic mode of operation, the work vehicle speed system 108 may be controlled automatically or semi-automatically by the work vehicle control system 102.

The work vehicle steering system 110 may control the steering of the work vehicle. In the illustrated embodiment, the work vehicle steering system 110 includes a wheel angle control system 144, a differential braking system 146, and a torque vectoring system 148. The wheel angle control system 144 may rotate one or more wheels or tracks of the work vehicle (e.g., via mechanical or hydraulic actuators) to steer the work vehicle along a path. By way of example, the wheel angle control system 144 may rotate front wheels/tracks, rear wheels/tracks, and/or intermediate wheels/tracks of the work vehicle, either individually or in groups. In some embodiments, steering may be accomplished by varying the speed of wheels or tracks on either side of the work vehicle. In some embodiments, the wheel angle control system 144 may be hydraulically actuated rather than, or in addition to, mechanically actuated (e.g., via gears). A hydraulically actuated steering system 110 may enable the work vehicle to turn without corresponding movement of a steering wheel (or other steering input device) inside the cab during an automatic or semi-automatic drive mode. The differential braking system 146 may independently vary the braking force on each side of the work vehicle to direct the work vehicle along the path. Similarly, the torque vectoring system 148 may differentially apply torque from the engine to wheels and/or tracks on each side of the work vehicle, thereby directing the work vehicle along the path. While the illustrated work vehicle steering system 110 includes the wheel angle control system 144, the differential braking system 146, and the torque vectoring system 148, alternative embodiments may include any of these systems, in any suitable combination. Further embodiments may include a work vehicle steering system having other and/or additional systems to facilitate directing the work vehicle along the path (e.g., an articulated steering system, etc.). The work vehicle steering system 110 may be controlled by the operator in a manual mode of operation. In an automatic or semi-automatic mode of operation, the work vehicle steering system 110 may be controlled automatically by the work vehicle control system 102. For example, in a semi-automatic mode of operation, the steering system 110 may be automatically controlled by the work vehicle control system 102, and the speed system 108 may be controlled by the operator. In a fully automatic mode of operation, both the speed system 108 and the steering system 110 may be controlled by the control system 102.

The implement control system 112 may be used to control the implement. For example, the implement control system 112 may turn the implement, raise or lower the implement, engage or disengage the implement, deploy ground-engaging tools of the implement, control the speed of the implement, etc., or a combination thereof. In the illustrated embodiment, the implement control system 112 includes an implement steering system 150, an implement engagement system 152, and an implement height system 154. The implement steering system may turn the implement (e.g., by actuating one or more wheels and/or tracks) based on signal(s) received from the work vehicle control system 102. For example, if the imaging system 104 or the work vehicle control system 102 determine that the row units of the implement are not aligned with the strips, the control system 102 may generate a control signal to the implement steering system 150 to steer the implement to align the row units with the strips. In some embodiments, steering may be accomplished by varying the speed of wheels or tracks on either side of the work vehicle. In some embodiments, the implement steering system 150 may be hydraulically actuated rather than, or in addition to, mechanically actuated (e.g., via gears). The implement engagement system 152 controls whether the implement is engaged and its position relative to the ground. In some embodiments, for example, the implement may be disengaged and/or retracted such that the work vehicle can traverse a soft boundary (e.g., tall grass) or a portion of the field that is not being tilled and/or cultivated. The implement height system 154 may be used to control the height of the engaged implement relative to the ground. While the illustrated implement control system 112 includes the implement steering system 150, the implement engagement system 152, and the implement height system 154, alternative embodiments may include any of these systems, in any suitable combination. Further embodiments may include a implement control system 112 having other and/or additional systems to facilitate directing the work vehicle along the path (e.g., an articulated steering system, etc.). The implement control system 112 may be controlled by the operator in a manual mode of operation. In an automatic or semi-automatic mode of operation, the implement control system 112 may be controlled automatically by the work vehicle control system 102.

The operator interface 114 may be disposed inside the cab of the work vehicle and be configured to display information for, and receive inputs from, the operator. In the illustrated embodiment, the operator interface 114 includes a processor 156, a memory component 158, communication circuitry 160, a display 162, and operator inputs 164. The processor 156 may include one or more general-purpose processors, one or more application specific integrated circuits, one or more field programmable gate arrays, or the like. The memory 158 may be any tangible, non-transitory, computer readable medium that is capable of storing instructions executable by the processor 156 and/or data that may be processed by the processor 156. The memory 158 may include volatile memory, such as random access memory, or non-volatile memory, such as hard disk drives, read-only memory, optical disks, flash memory, and the like. The communication circuitry 160 may be configured to communicate with the work vehicle control system 102 (e.g., via the communication circuitry 120 of the work vehicle control system 102). In some embodiments, the communication circuitry 120, 160 may communicate with various components in the system wirelessly. In some embodiments, the operator interface 114 and the work vehicle control system 102 may be disposed within the same housing, may share processors 116, 156, memory components 118, 158, and/or communication circuitry 120, 160. In further embodiments, the work vehicle control system 102 and the operator interface 114 may be the same component. The operator interface 114 includes the display 162 configured to display information related to the agricultural system 10 to the operator. The display 162 may be a screen, an array of LEDs, a series of gauges, a combination thereof, or some other arrangement. The operator interface 114 also includes the operator inputs 164 that enables a user to input information. The operator inputs 164 may be a keyboard, a series of buttons, a joystick, a mouse, a track pad, etc. In some embodiments, the display 162 and the operator input 164 may be a single component (e.g., a touchscreen).

As the work vehicle tows the implement through the field, the imaging system captures images via the imaging device(s), which may be mounted on the work vehicle or on the implement, and may face forward or rearward relative to the direction of travel of the agricultural system. Images may be taken periodically, at set intervals, at triggering events (e.g., user depresses a button), or substantially continuously. The imaging system 104 may process and analyze the data to identify the locations of the strips in the images. The strip locations from the images may be compared to a map of the field and/or the locations of the row units of the implement. In some embodiments, the control system 102 may automatically take corrective action, steering the work vehicle 12 and/or the implement 14 to align the row units with the strips. In other embodiments, a notification may be displayed on the display 162 of the operator interface 114 indicating to a user that the row units are not aligned with the strips. In response, the user may instruct the control system 102 to take a corrective action suggested by the control system 102, or the user may manually control the work vehicle steering system 110 and/or the implement control system 112 to align the row units with the strips. In such an embodiment, the control system 102 may be disposed on the work vehicle, on the implement, or both.

Figure 3:
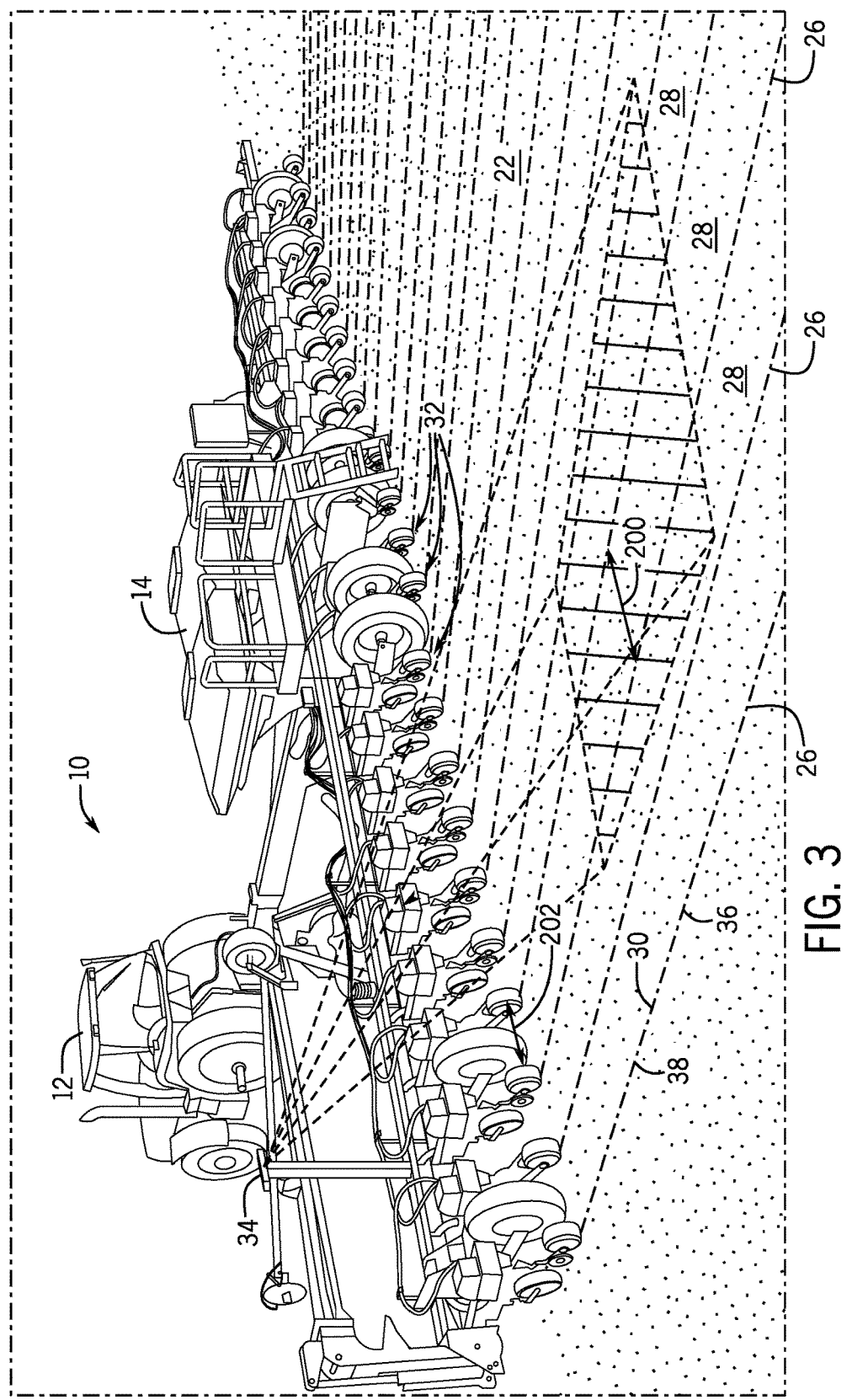
FIG. 3 is a perspective view of an embodiment of the agricultural system of FIG. 1.

FIG. 3 is a perspective view of the agricultural system 10 of FIG. 1. As shown, the agricultural system 10 includes the work vehicle 12, which tows the implement 14 across the field 22. In the instant embodiment, the field 22 is configured for strip tilling, in which strips 26 of the field 22 are tilled. The strips 26 are separated by untilled rows 28. Each strip 26 includes the tilling tracking line 36 and the planting tracking line 38 extending along the strip 26. In the instant embodiment, both the tilling tracking line 36 and the planting tracking line 38 extend through the center line 30 of each strip 26, but in some embodiments, the tilling tracking line 36 and/or the planting tracking line 38 may be offset from the center line 30 of each strip 26. As previously discussed, the implement 14 may be a planter, a tillage tool, or some other implement. The implement includes row units 32, each separated by a distance 202, which may or may not be the same as the distance 200 between center lines 30.

As previously described, the one or more imaging devices 34 may capture images of the field 22 as the agricultural system 10 traverses the field 22. In the instant embodiment, the imaging device 34 is rearward facing (e.g., away from the work vehicle, opposite the direction of travel, etc.), but in some embodiments the imaging device may be forward facing (e.g., toward the work vehicle, in the direction of travel, etc.). The images captured by the imaging device(s) may include a portion of the implement (e.g., one or more of the row units 32, or one or more other reference points), and/or the imaging system may store the location of the row units 32 relative to the one or more imaging devices 34. The processor of the imaging system and/or the processor of the control system analyzes one or more images captured by the imaging device(s) 34 to determine whether the row units 32 are aligned with the strips (e.g., for planting) or the center lines of each strip 26 (e.g., for tilling). As is described below, the determination of alignment of the row units 32 of the implement 14 and the strips 26 of the field 22 may be made based on a single strip 26 and single row unit 32 and extrapolated to the rest of the implement 14, or determined based on a plurality of row units 32 and corresponding strips 26.

Figure 4:
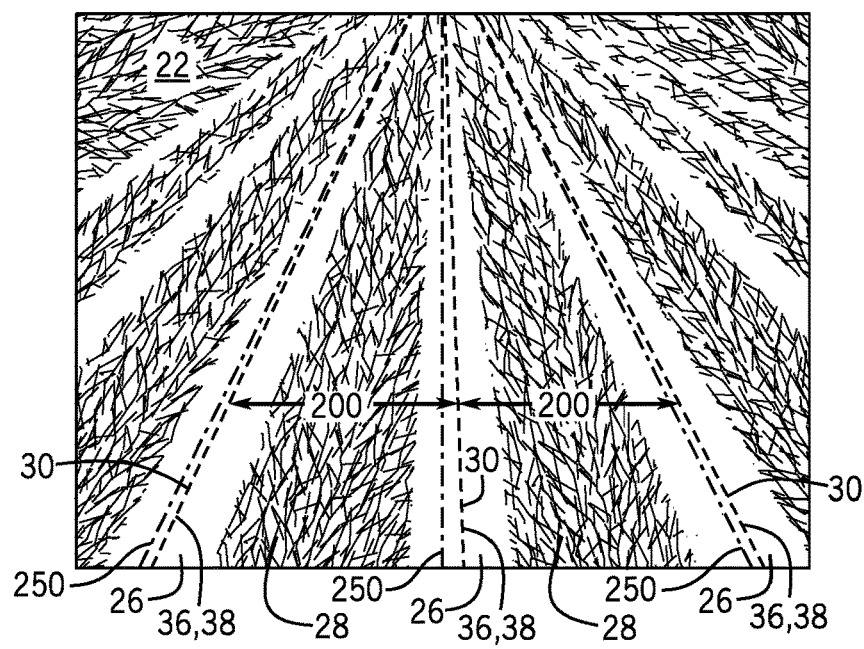
FIG. 4 is an embodiment of an image captured by one or more imaging devices of an imaging system of the control system of FIG. 2.

FIG. 4 is an embodiment of an image captured by one of the imaging devices. In the illustrated embodiment, the image does not include a part of the implement, but the position of the row units relative to the imaging device are stored by the control system. In the illustrated embodiment, one of the row units is centered beneath the imaging device. As shown, the tilling line 36 and the planting line 38 extend along center line 30 of each strip 26, separated from one another by a distance 200. Implement lines 250 represent the location of the row units 32 as the agricultural system traverses the field 22. In some embodiments, the location of the tilling line 36 and/or the planting line 38 may be determined based on the captured images, while the location of the implement lines 250 may be stored within the control system. In other embodiments, the location of the implement lines 250 may be determined based on the captured images, while the location of the tilling line 36 and/or the planting line 38 may be determined based on a map. In the instant embodiment, the implement lines 250 and the tilling line 36 and/or the planting line 38 are offset by 2 inches, indicating that the implement is not properly aligned with the strips 26 of the field 22. The implement line 250 and the tilling line 36 and/or the planting line 38 may be determined to be aligned if an angle of incidence between the implement line 250 and the tilling tracking line 36 and/or the planting line 38 and/or an offset distance between the implement line 250 and the tilling tracking line 36 and/or the planting line 38 is below a threshold value. In response, the work vehicle control system may take corrective action by steering the work vehicle or the implement in order to align the implement 250 with the tilling tracking lines 36 and/or the planting tracking lines 38.

Figure 5:
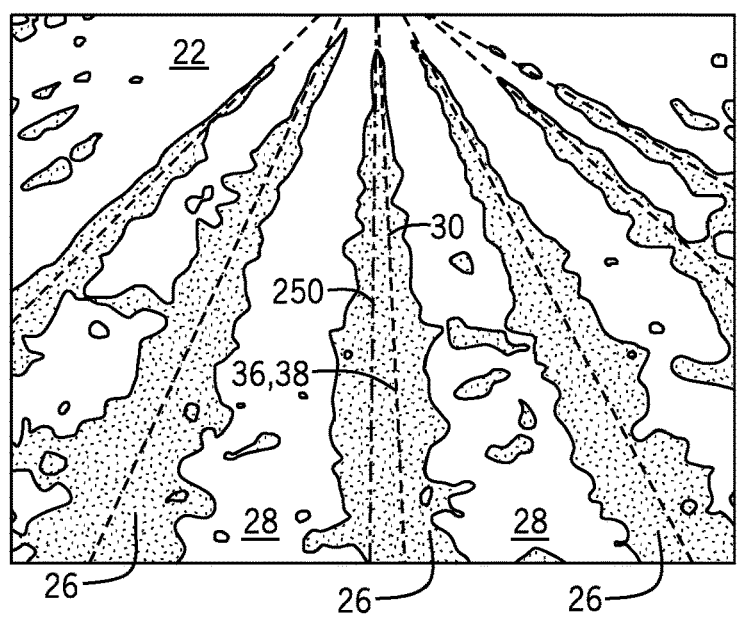
FIG. 5 is an embodiment of a processed image generated by the imaging system of the control system of FIG. 2.

FIG. 5 is an embodiment of a processed image generated by the imaging system. As part of the image processing, the imaging system may apply one or more pre-processing filters to the captured data (see, e.g., FIG. 4), transformation functions (e.g., to correct for perspective, distortion, etc.), and/or convert the image to an alternative color map (e.g. NVDI, HSV, or gray-scale) if applicable. From there, the imaging system may identify strips 26 and untilled rows 28. The imaging system may then determine the center of each strip 26 and/or the center of the un-tilled region between two adjacent strips 28 (e.g., the midpoint across the width of the strip 26) at one or more locations along the length of the strip 26. The imaging system may then fit a line through the centers at the various locations to determine a center line 30 of the strip. The imaging system then uses stored or selected parameters for the configuration of the imaging system (e.g. field of view, angle of view, mounting location, etc.) to determine the location of the implement line and the desired tracking line for the current operations (e.g., tillage tracking line 36, planting tracking line 38, etc.). If the implement line is offset from the desired tracking line, then the system may take corrective action to minimize the tracking error. Processing of the imaging data may utilize feature detection, edge detection, textural analysis, frequency analysis (e.g., wavelet transform), disparity maps (e.g., using infrared or stereo imagery), etc.

As described above with regard to FIG. 4, in the instant embodiment, the implement lines 250 and the tilling line 36 and/or the planting line 38 are offset by 2 inches, indicating that the implement is not properly aligned with the strips 26 of the field 22. In response, the work vehicle control system may take corrective action by steering the work vehicle or the implement in order to align the implement lines 250 and the tilling tracking line 36 and/or the planting tracking line 38. In other embodiments, an indication may be displayed to the user, prompting the user to take corrective action (e.g., steering the work vehicle or the implement).

Figure 6:
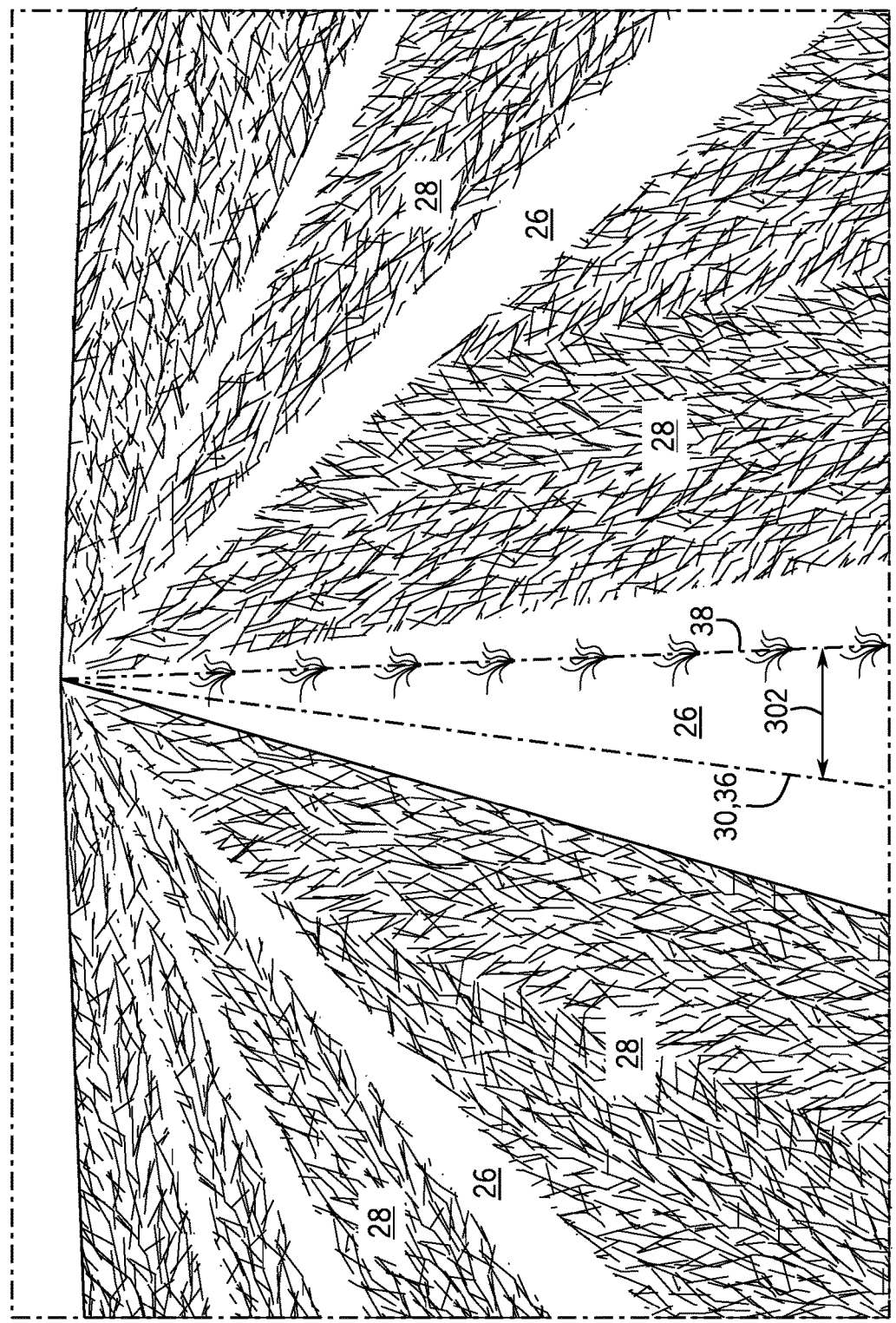
FIG. 6 is an embodiment of an image captured by the one or more imaging devices of the control system of FIG. 2 utilizing strip tilling and offset planting.

FIG. 6 is an embodiment of an image captured by one of the imaging devices of an agricultural operation utilizing strip tilling and offset planting. As with previous embodiments described above, strips 26 are separated from rows of untilled land 28. However, rather than the planting lines 38 (e.g., the line along which seeds are planted) extending along the center line 30 of respective strips 26, each planting line 38 is off-set from each center line 30 of each strip 26 by a distance 302. In such an embodiment, the tilling tracking line 36 may be aligned with the center line 30, and the planting line 38 may be offset from the center line 30 by a distance 302. Similarly, in other embodiments the tilling tracking line 36 may be offset from the center line 30 while the planting line 38 may or may not be offset from the center line 30.

Figure 7:
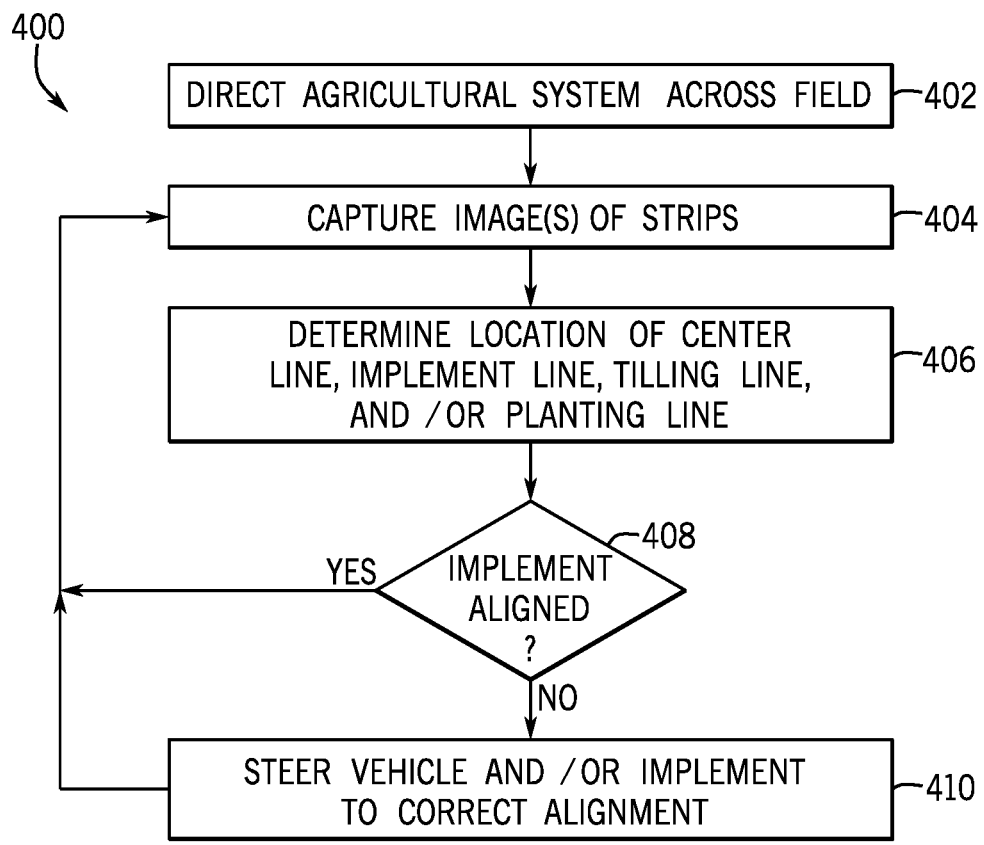
FIG. 7 is a flow chart of an embodiment of a process for aligning an implement of the agricultural system of FIG. 1 with strips of a field utilizing strip tilling.

FIG. 7 is a flow chart of an embodiment of a process 400 for aligning the implement with strips of the field. In block 402, the agricultural system (e.g., the work vehicle and the implement) is directed across the field. As previously discussed, the field includes strips separated by rows of untilled land. As the agricultural system traverses the field, images are captured (block 404) of the one or more strips of the field. The images may be captured by one or more imaging devices, which may be disposed on the work vehicle and/or the implement, and may be forward facing or rearward facing. The images may include portions of the implement (e.g., row units or reference points), or the position and orientation of the imaging device relative to the row units may be stored within the control system. In block 406, the images are processed to determine locations of the center line of each strip, the implement line, the tracking line of each strip. As discussed above, this may be performed by a process of determining the center of the one or more strips at multiple locations along the length of the strip and then fitting a straight line through the determined centers or averaging the determined centers along the length of the strip.

In decision 408, a determination is made as to whether the implement is aligned with the strips. Specifically, a determination is made as to whether the implement line is aligned with the tracking line. If the implement is aligned with the strips, the process 400 returns to block 404 and additional images are captured. If the implement is not aligned with the strips, the control system steers the work vehicle and/or the implement to correct the alignment (block 410) between the implement line and the tracking line. In other embodiments, an indication may be displayed to the user, prompting the user to take corrective action.

For agricultural applications utilizing strip tilling, being able to repeatedly and consistently align one or more implements with the strips of a field may increase the efficiency of the agricultural application and reduce operator fatigue. The disclosed techniques include one or more imaging devices coupled to the work vehicle or the implement and configured to capture images of the field as the implement traverses the field. The images may be processed to determine the locations of one or more tracking lines of one or more strips relative to the position of one or more row units of the implement. If the implement is not aligned with the strips of the field, the control system may steer the work vehicle and/or the implement into alignment with the strips, or an indication may be displayed to the user, prompting the user to take corrective action.

While only certain features of the disclosed subject matter have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural system, comprising:
a frame;
one or more row units coupled to the frame;
one or more imaging devices coupled to the frame, wherein the one or more imaging devices are configured to capture images of a field beneath the agricultural system as the agricultural system traverses the field; and
a controller comprising a processor and a memory, wherein the controller is configured to process the images captured by the one or more imaging devices, wherein processing the captured images comprises:
determining, based on the captured images, a location of an implement line aligned with a first row unit of the one or more row units;
determining, based on the captured images, a location of a center line of a first strip of a plurality of strips of the field, wherein the plurality of strips are separated by a plurality of rows of untilled land;
determining, based on the captured images, a location of a tracking line; and
determining whether the implement line and the tracking line are aligned with one another.

2. The agricultural system of claim 1, wherein the agricultural system comprises a drawn implement or self-propelled implement.

3. The agricultural system of claim 1, wherein the processor is configured to generate a control signal to steer the agricultural system, to steer a work vehicle towing the agricultural system, or a combination thereof, in response to determining that the implement line and the tracking line are not aligned with one another.

4. The agricultural system of claim 1, wherein the processor is configured to generate a notification to be displayed to a user in response to determining that the implement line and the tracking line are not aligned with one another.

5. The agricultural system of claim 1, wherein the imaging devices are rearward facing relative to a direction of travel of the agricultural system.

6. The agricultural system of claim 1, wherein the imaging devices are forward facing relative to a direction of travel of the agricultural system.

7. The agricultural system of claim 1, wherein determining the location of the center line of the first strip of the plurality of strips comprises:
identifying the first strip in the images;
determining a center point along a width of the first strip at each of a plurality of locations; and
fitting a center line through the plurality of determined center points.

8. The agricultural system of claim 7, wherein the tracking line is offset from the center line.

9. An imaging system, comprising:
one or more imaging devices configured to be coupled to a frame of an agricultural system, and to capture images of a field beneath the agricultural system as the agricultural system traverses the field; and
a controller comprising a processor and a memory, wherein the controller is configured to process the images captured by the one or more imaging devices, wherein processing the captured images comprises:
determining, based on the captured images, a location of an implement line aligned with a first row unit of the agricultural system;
determining, based on the captured images, a location of a tracking line of a first strip of a plurality of strips of the field, wherein the plurality of strips are separated by a plurality of rows of untilled land; and
determining, based on the captured images, whether the implement line and the tracking line are aligned with one another.

10. The imaging system of claim 9, wherein the one or more imaging devices comprise a digital camera, an analog camera, a red-green-blue (RGB) camera, red-green-blue-depth (RGB-D) camera, an infrared (IR) camera, or a combination thereof.

11. The imaging system of claim 9, wherein the one or more imaging devices comprise a laser scanner, radar sensor, a proximity sensor, or a combination thereof.

12. The imaging system of claim 9, wherein the agricultural system comprises a work vehicle, drawn implement, or self-propelled implement.

13. The imaging system of claim 9, wherein the processor is configured to generate a control signal to steer an implement of the agricultural system, to steer a work vehicle of the agricultural implement, or a combination thereof, in response to determining that the implement line and the tracking line are not aligned with one another.

14. The imaging system of claim 9, wherein the processor is configured to generate a notification to be displayed to a user in response to determining that the implement line and the tracking line are not aligned with one another.

15. The imaging system of claim 9, wherein determining the location of the center line of the first strip of the plurality of strips comprises:
identifying the first strip in the images;
determining a center point along a width of the first strip at each of a plurality of locations; and
fitting a center line through the plurality of determined center points.

16. The imaging system of claim 9, wherein the tracking line is offset from the center line.

17. A method, comprising:
directing an agricultural system across a field, wherein the agricultural system includes a work vehicle and an implement, and wherein the implement comprises one or more row units;
capturing one or more images of the field beneath the agricultural system as the agricultural system traverses the field, via one or more imaging devices coupled to the agricultural system; and
processing the captured images, comprising:
determining, based on the one or more captured images, a location of an implement line aligned with a first row unit of the one or more row units;
determining, based on the one or more captured images, a location of a tracking line of a first strip of a plurality of strips of the field, wherein the plurality of strips are separated by a plurality of rows of untilled land; and
determining, based on the one or more captured images, whether the implement line and the tracking line are aligned with one another.

18. The method of claim 17, comprising generating a control signal to steer the implement, to steer a work vehicle towing the implement, or a combination thereof, in response to determining that the implement line and the tilling line or the planting line are not aligned with one another.

19. The method of claim 17, comprising generating notification to be displayed to a user in response to determining that the implement line and the tilling line or the planting line are not aligned with one another.

20. The method of claim 17, wherein determining the location of the tilling line or the planting line of the first strip of the plurality of strips comprises:
- identifying the first strip in the images;
- determining a center point along a width of the first strip at each of a plurality of locations; and
- fitting a center line through the plurality of determined center points.

* * * * *